(12) United States Patent
Goetz et al.

(10) Patent No.: US 8,584,136 B2
(45) Date of Patent: Nov. 12, 2013

(54) CONTEXT-AWARE REQUEST DISPATCHING IN CLUSTERED ENVIRONMENTS

(75) Inventors: Oliver C. Goetz, Nussloch (DE); Bernhard Drabant, Muehlhausen (DE); Erik Dick, Wiesloch (DE)

(73) Assignee: SAP AG, Walldorf (DE)

( * ) Notice: Subject to any disclaimer, the term of this patent is extended or adjusted under 35 U.S.C. 154(b) by 100 days.

(21) Appl. No.: 13/209,841

(22) Filed: Aug. 15, 2011

(65) Prior Publication Data
US 2013/0047165 A1    Feb. 21, 2013

(51) Int. Cl.
*G06F 9/46*    (2006.01)

(52) U.S. Cl.
USPC .......................................................... 718/105

(58) Field of Classification Search
USPC .......................................................... 718/105
See application file for complete search history.

(56) References Cited

U.S. PATENT DOCUMENTS

| | | | |
|---|---|---|---|
| 7,480,920 B2 | 1/2009 | Brendle et al. | |
| 7,571,175 B2 | 8/2009 | Goetz | |
| 7,752,484 B2 | 7/2010 | Goetz et al. | |
| 7,770,146 B2 | 8/2010 | Brunswig et al. | |
| 7,774,463 B2 | 8/2010 | Bloching et al. | |
| 7,930,251 B2 | 4/2011 | Bloching et al. | |
| 2003/0135621 A1* | 7/2003 | Romagnoli | 709/226 |
| 2005/0102676 A1* | 5/2005 | Forrester | 718/105 |
| 2006/0155735 A1* | 7/2006 | Traut et al. | 707/101 |
| 2009/0328054 A1* | 12/2009 | Paramasivam et al. | 718/105 |
| 2010/0115515 A1 | 5/2010 | Drabant et al. | |
| 2011/0153827 A1* | 6/2011 | Yengalasetti et al. | 709/226 |
| 2011/0154312 A1 | 6/2011 | Balko et al. | |
| 2011/0154358 A1* | 6/2011 | Di Balsamo et al. | 718/105 |

* cited by examiner

*Primary Examiner* — Emerson Puente
*Assistant Examiner* — Steven Do
(74) *Attorney, Agent, or Firm* — Fish & Richardson P.C.

(57) ABSTRACT

The present disclosure involves systems, software, and computer implemented methods for providing context-aware request dispatching in a clustered environment. One process includes operations for receiving an event at a first computer node. The contents of the event are analyzed to determine a target process instance for handling the event. A target computer node hosting the target process instance is determined, and the event is sent to the target computer node for handling by the target process instance.

20 Claims, 5 Drawing Sheets

CONTEXT-AWARE REQUEST DISPATCHING IN CLUSTERED ENVIRONMENTS

TECHNICAL FIELD

The present disclosure relates to software, computer systems, and computer implemented methods for providing context-aware request dispatching in a clustered environment.

BACKGROUND

The increased use of high bandwidth networks and data connections, and high capacity data storage servers, coupled with a growing need for scalability in response to increased workload demands, has resulted in the implementation of different computing models such as distributed computing systems, cloud computing networks, and clustered environments. In a clustered environment, the workload of a server can be distributed across multiple computers. Additional computers, or nodes, can be added to (or removed from) the clustered environment as needed to accommodate and manage increases (or decreases) in workload. In some instances, load balancers can be used to distribute incoming requests to the various nodes within the clustered environment for processing of the requests.

SUMMARY

The present disclosure describes techniques for providing context-aware request dispatching in a clustered environment. A computer program product is encoded on a tangible storage medium, where the product comprises computer readable instructions for causing one or more processors to perform operations. These operations can include receiving an event at a first computer node. The contents of the event are analyzed to determine a target process instance for handling the event. A target computer node hosting the target process instance is determined, and the event is sent to the target computer node for handling by the target process instance.

These and other embodiments can optionally include one or more of the following features. The target computer node is the first computer node. The event is one of a message or a request. The event is received from a load balancer, the load balancer configured to distribute events to computer nodes within a clustered environment associated with the first computer node and the target computer node. The load balancer is further configured to distribute events to computer nodes without analyzing contents of the events. The first computer node and the target computer node are computing devices utilized in a clustered business process management environment. Determining the target computer node comprises identifying an authoritative indexer node associated with the target process instance; requesting resolution information from the authoritative indexer node; and identifying the target computer node based on resolution information received from the authoritative indexer node. Identifying the authoritative indexer node comprises applying a hash function to an identifier of the target process instance to determine the authoritative indexer node associated with the target process instance. The resolution information is determined by retrieving index data associated with the target process instance from a computer node other than the authoritative indexer node.

While generally described as a computer program product encoded on a tangible storage medium that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally describes computer systems, software, and computer implemented methods for providing context-aware request dispatching in a clustered environment. In cluster node infrastructures, multiple computer nodes, or cluster node instances, can be used to provide an application or service to external components. In some instances, the nodes within a cluster can be configured to perform one or more similar functions and can also share a resource, such as a common database. An incoming request or event received at a first cluster node instance (hereafter referred to as a "cluster node") may need to be forwarded to a second, receiving cluster node for processing. As used in the present disclosure, an event is a message or request exchanged between applications and/or business processes. Accordingly, when referring to incoming items received by components within a cluster, the terms "event," "request," and "message" can be used interchangeably, unless indicated otherwise, without departing from the scope of the present disclosure. The incoming request can comprise a message or work request exchanged between applications and/or business processes. The first cluster node can include dispatcher functionality for performing semantic evaluation of the incoming request to determine if the incoming request should be connected to an active target process. The request can then be rerouted to the appropriate cluster node containing the target process.

Business processes are run by business process management (BPM) applications, orchestrating process steps such as automated activities, user tasks, and events that synchronize a process with other components. These process steps often interact with external applications and devices. For instance, a user task may be sent to a user's mobile device where it is processed, passing back data to the underlying business process. In another example, an radio frequency identification (RFID) reader may send a signal to a business process where it is consumed in an event to trigger certain follow-up actions. In another example, a business process calls out from an automated activity to an enterprise resource planning (ERP) system to alter a business object (e.g., an invoice or a material) that is managed there.

In some implementations, BPM applications can be offered as on-demand installations in a cloud computing network to support on-demand business applications and to benefit from a low total cost of ownership that comes with the intrinsic elasticity and scalability characteristics of the cloud infrastructure. Technically, a single BPM installation is distributed across a dynamic range of computer "nodes" provided by the underlying clustered infrastructure. Those nodes jointly run a number of business processes. The number of nodes may grow whenever there is a larger workload to be processed at a time or shrink whenever there is a smaller workload to be processed. Some of the nodes may execute different instances of particular business processes, while other nodes may execute entirely different business processes in various implementations.

Figure 1:
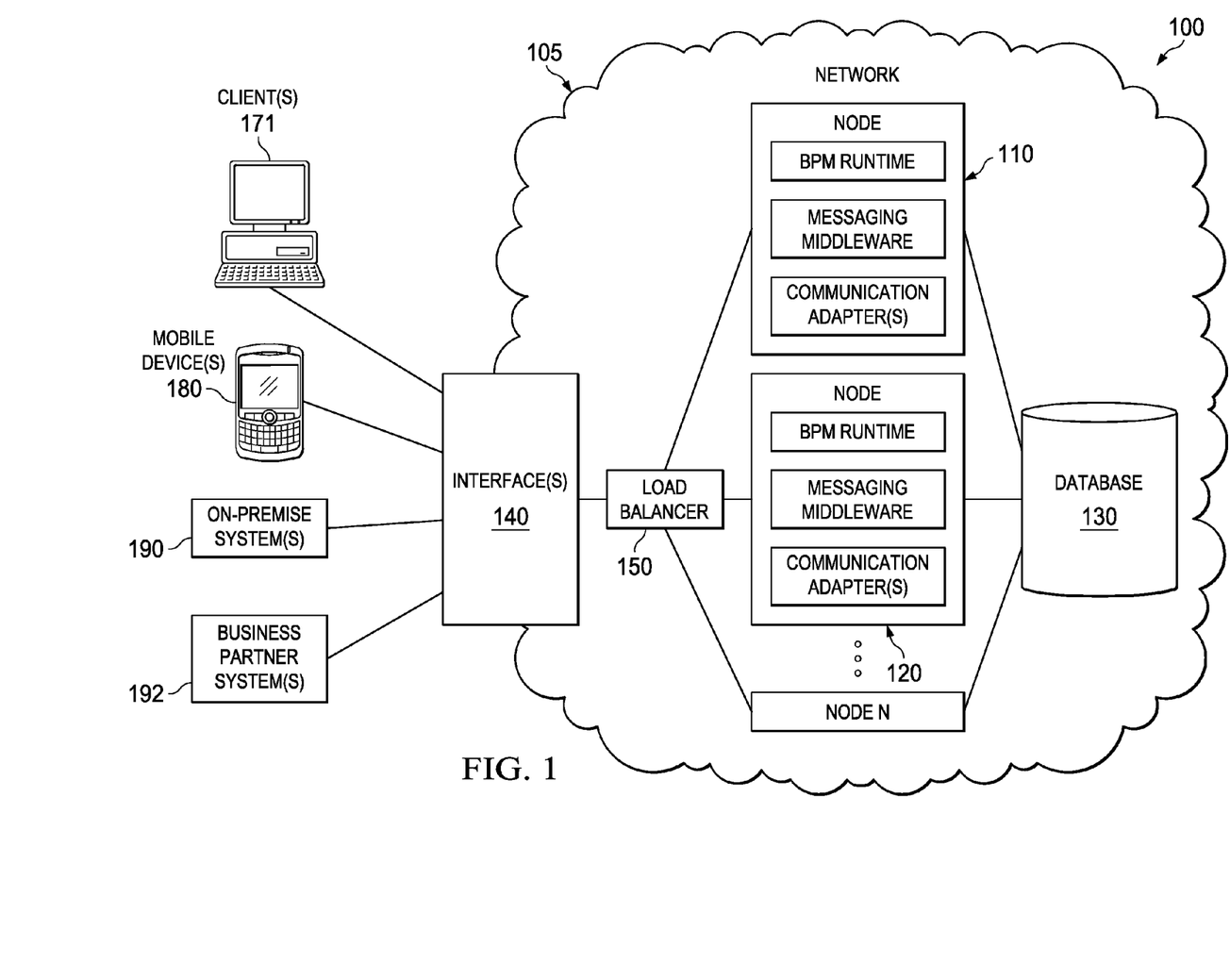
FIG. 1 illustrates an example environment for a clustered computing infrastructure.

Turning to the illustrated example, FIG. 1 illustrates an example environment 100 for executing business processes in a cluster node infrastructure. The illustrated environment 100 includes or is communicably coupled with a plurality of components in a network such as network 105. In general, environment 100 depicts an example configuration of a system capable of orchestrating process steps such as automated activities, user tasks, and events within network 105 in synchronization with external applications and devices, such as mobile devices 180 or clients 171. In the illustrated example, BPM applications are executed in a distributed computing system. The BPM applications can be distributed across multiple cluster nodes in the network 105, including nodes 110, 120, and so on. Each of the cluster nodes can be a computer, processor, server, or any appropriate computing device. Further, each node in a cluster can share resources, such as a common database 130. In some instances, the cluster computing infrastructure can be implemented within a cloud computing environment (not illustrated), and the terms "cloud instance" may be also analogous to a "cluster node."

Each cluster node in network 105 can include a plurality of different components needed to run a number of business processes or process instances. For example, as depicted in FIG. 1, the cluster nodes can include a business process management (BPM) runtime environment, messaging middleware, or communication adapters. The internal components at the cluster nodes allow the cluster node to perform process steps associated with applications, such as a BPM application, communicate with other cluster nodes or external components, receive and respond to events from external components, and execute business processes. The implementation of the BPM application in a cluster computing environment provides flexibility and scalability to the BPM application by assigning additional cluster nodes when needed to handle additional workload.

As seen in FIG. 1, a BPM application in a cluster infrastructure can also be connected to other external software components for providing services to the external software components. For example, the BPM application can be connected to external components including one or more clients 171, mobile devices 180, on-premise systems 190, and other business partner systems 192. The external components can run client software components that interact with the BPM application through network 105. Business processes running at computer nodes 110 and 120 can exchange events with the external software components. Further, network 105 can also include components for facilitating communications between the external components and computer nodes, such as interfaces 140 for managing and synchronizing communications in network 105 and/or a load balancer 150 for managing distribution of workload among cluster nodes. A typical load balancer 150 can be used to divide a total workload into smaller work packages of fixed size before assigning the work packages to available work processes. Generally, the typical load balancer 150 receives a message and distributes the message to an available cluster node, although not necessarily to a particular cluster node associated with the received message. In some instances, the load balancer 150 may include a J2EE dispatcher or other request dispatcher for forwarding requests to specified resources.

In certain implementations, a cluster-enablement protocol can be used to address problems with scalability in a cluster-based BPM implementation. A cluster-enablement protocol can rely on an eviction algorithm to transport full process instances between two cluster nodes. In some instances, a software component issues a request on a first cluster node while the affected process instance that is supposed to receive the request is currently running on a second, different cluster node. The process instance associated with the first cluster node may be evicted from the first cluster node and migrated to the second, different cluster node in order to process the incoming request while maintaining synchronization with the request.

For example, as depicted in FIG. 1, an external software component (e.g., task management software) running on an external device at client 171 can submit a request to a BPM application distributed across multiple cluster nodes, including nodes 110 and 120. In some implementations, the request is first received at load balancer 150, which determines a particular cluster node to which to distribute the request. Load balancer 150, however, may not dispatch the incoming request to the most advantageous cluster node. For example, the dispatch functionality of load balancer 150 may randomly distribute incoming requests to different cluster nodes even though a particular request may be targeted at a specific running process instance which may be currently executed on a specific cluster node.

In the illustrated example, the request may be received by a particular process instance at node 110, but the processing of the request may need to be performed by a different process instance at a different node 120. Based on a cluster-enablement protocol, the BPM application waits for the process instance at node 120 to reach an idle state, such as when waiting for a user task to be completed. During the idle state, the process instance at node 120, including its state information, is evicted from node 120 and persisted onto a database. Node 110 then recovers the process instance by loading the state information from the database and resuming the process instance at node 110. The received event is then passed to the process instance at node 110, which effectively synchronizes the process state. In other words, the request is "passed" to the target process instance through dehydration of the target process instance from a different cluster node 120 and hydration of the target process instance onto the cluster node 110 at which the event is presently located. As described in further detail below, hydration of a process instance includes pulling the process instance and state information from a database and generating synchronized process instances. Dehydration includes pushing or storing information in a database along with current state information.

The cluster-enablement protocol may result in latency and throughput issues in certain situations. First, performance of the business processes in the BPM implementation may be adversely affected when the process instances are associated with complex states. Many customer scenarios come with large process models that employ deeply nested subflow invocations. In effect, the process state that needs to be persisted and fetched to and from the database in a cluster transport may be prohibitively large and may generate substantial load on the database. Further, certain factors may cause frequent cluster transports, which can further occupy system resources. Some business process models contain many artifacts that may trigger a cluster transport. Examples of artifacts that may trigger cluster transports are human activities, intermediate message events, timer events, and synchronous process interfaces. Generally, each occurrence of these artifacts may trigger transporting a process instance across a cluster, which can be a costly operation for system resources.

Additionally, many process models may rarely encounter an idle state, which is a prerequisite for performing a cluster transport. A number of artifacts can inhibit idle situations, such as sequential or parallel loops, automated activities invoking long-running services (e.g., ERP Enterprise Services), and customer-provided data mapping functions which can be arbitrarily complex and, hence, consume processing time in an unpredictable manner. When the artifacts reside on parallel branches in any subflow of the calling stack, they may temporarily inhibit the process from being evicted as part of a cluster transport. In effect, the request to deliver an event to the process fails and needs to be repeated later.

In a cluster-based infrastructure, the requests transmitted by an external component can arrive at a particular cluster node while the receiving process instance that will be processing the request may reside on another cluster node. A protocol to consistently dispatch the events to the receiving business processes in a distributed cluster infrastructure can be provided. As used in the present disclosure, the receiving process instance that ultimately handles the received event can also be referred to as the "target process instance." When either the number of events or the number of process instances increases, both process turnaround times and overall process end-to-end throughput can be easily compensated for by assigning additional cloud instances to handle the additional workload.

Further, by performing semantic evaluation of an incoming event and rerouting the event to an appropriate cluster node, the target process instance does not need to be transported across clusters or nodes in the clustered infrastructure. Accordingly, an event no longer needs to wait for the target process instance to be transported across the cluster in order to complete the delivery transaction. For example, in some cases, the target process instance may be in an execution state on its host cluster node and may not be able to be migrated. Depending on the particular state or the current execution status of the target process instance, the target process instance may be locked, preventing it from being dehydrated for migration. Finally, the likelihood of failing to deliver an event is also substantially reduced because a process instance that is unable to be transported across a node cluster can no longer block the event from being delivered.

The present disclosure addresses the challenges associated with high-load processing in a cluster computing infrastructure by introducing second-level dispatcher functionality capable of performing semantic, or context-aware, evaluation of incoming requests to determine an appropriate cluster node to receive or process the incoming request. In some implementations, incoming requests are targeted at or associated with active process instances located at certain cluster nodes. The requests are rerouted to the appropriate cluster node containing the target process instance for processing of the incoming request. The logic for this second-level dispatcher functionality can be provided at each cluster node within a cluster so that, regardless of where an incoming event is initially dispatched, the event can be rerouted as necessary to the appropriate cluster node housing the target process instance for processing.

Figure 2:
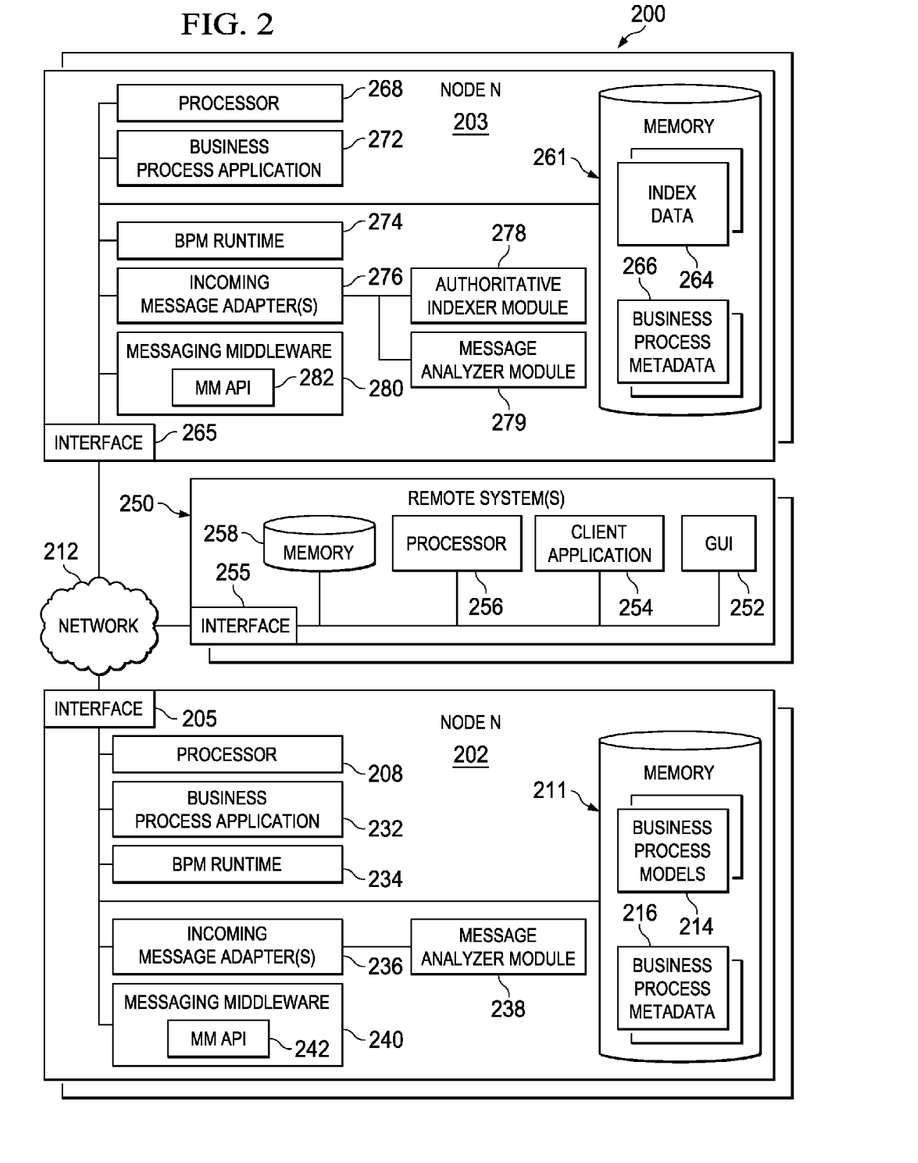
FIG. 2 illustrates a diagram of example components included in a computer node in a clustered computing infrastructure.

FIG. 2 illustrates an environment 200 showing example components in a cluster node 202 for providing context-aware request dispatching in clustered environments. Environment 200 includes one or more remote systems 250 and one or more computer nodes 202, at least some of which communicate across network 212. In general, environment 200 depicts an example configuration of components used in a BPM implementation for processing requests received from external components. Computer node 202 represents an example node in a BPM implementation such as described above in relation to FIG. 1. The BPM implementation can include more than one node, and each node may include fewer, more, or different components depending on the implementation. In certain instances, node 202 and other cluster nodes can be logically grouped and accessible within a cloud computing network. Accordingly, the BPM implementation may be provided as an on-demand solution through the cloud computing network as well as a traditional server-client system or a local application at remote system 250.

In general, node 202 can be any electronic computing device, such as a server, operable to receive, transmit, process, store, or manage data and information associated with the environment 200. Node 202 can be a server that stores one or more business process applications 232, where at least a portion of the business process applications are executed via requests and responses sent to users or clients within and communicably coupled to the illustrated environment 200 of FIG. 2. In some instances, node 202 can store a plurality of various business process applications 232, while in other instances, node 202 can be a dedicated server meant to store and execute only a single business process application 232. In some instances, node 202 can comprise a web server or be communicably coupled with a web server, where the business process applications 232 represent one or more web-based applications accessed and executed via network 212 by remote system 250 to perform the programmed tasks or operations of the business process application 232.

Node 202 illustrated in FIG. 2 can be responsible for receiving application requests (i.e., events) from one or more client applications or business applications associated with the remote system 250 of environment 200, responding to the received requests by processing said requests in the business process application 232, and sending the appropriate response from the business process application 232 back to the requesting client application. Node 202 may also receive requests and respond to requests from other components on network 212, such as other nodes within the same cluster not illustrated in FIG. 2. Alternatively, the business process application 232 at node 202 can be capable of processing and responding to requests from a user locally accessing node 202. Accordingly, in addition to requests from the remote system 250 illustrated in FIG. 2, requests associated with the business process applications 232 may also be sent from internal users, external or third-party customers, other automated applications, as well as any other appropriate entities, individuals, systems, or computers.

As used in the present disclosure, the term "computer" is intended to encompass any suitable processing device. For example, although FIG. 2 illustrates a single node 202 comprising a computer, environment 200 can be implemented using one or more nodes, as well as computers other than servers, including a server pool. Indeed, node 202, remote system 250, and messaging system 222 can be any computer or processing device such as, for example, a blade server, general-purpose personal computer (PC), MACINTOSH, workstation, UNIX-based workstation, or any other suitable device. In other words, the present disclosure contemplates computers other than general purpose computers, as well as computers without conventional operating systems. Further, illustrated nodes 202, remote system 250, and messaging system 222 may be adapted to execute any operating system, including LINUX, UNIX, WINDOWS, MAC OS, or any other suitable operating system. According to one implementation, node 202 may also include or be communicably coupled with a mail server.

In the present implementation, and as shown in FIG. 2, node 202 includes a processor 208, an interface 205, a memory 211, and one or more business process applications 232. The interface 205 is used by the node 202 for communicating with other systems in a client-server or other distributed environment (including within environment 200) connected to the network 212 (e.g., remote system 250, as well as other systems communicably coupled to the network 212). Generally, the interface 205 comprises logic encoded in software and/or hardware in a suitable combination and operable to communicate with the network 212. More specifically, the interface 205 may comprise software supporting one or more communication protocols associated with communications such that the network 212 or interface's hardware is operable to communicate physical signals within and outside of the illustrated environment 200.

In some implementations, node 202 may also include a user interface, such as a graphical user interface (GUI). The GUI comprises a graphical user interface operable to, for example, allow the user of the server 202 to interface with at least a portion of the platform for any suitable purpose, such as creating, preparing, requesting, or analyzing data, as well as viewing and accessing source documents associated with business transactions. Generally, the GUI provides the particular user with an efficient and user-friendly presentation of business data provided by or communicated within the system. The GUI may also provide general interactive elements that allow a user to access and utilize various services and functions of business process application 232. The GUI is often configurable, supports a combination of tables and graphs (bar, line, pie, status dials, etc.), and is able to build real-time portals, where tabs are delineated by key characteristics (e.g., site or micro-site). Therefore, the GUI contemplates any suitable graphical user interface, such as a combination of a generic web browser, intelligent engine, and command line interface (CLI) that processes information in the platform and efficiently presents the results to the user visually.

Generally, example node 202 may be communicably coupled with a network 212 that facilitates wireless or wireline communications between the components of the environment 200 (i.e., between node 202 and remote system 250), as well as with any other local or remote computer, additional clients, servers, or other devices communicably coupled to network 212 but not illustrated in FIG. 2. In the illustrated environment, the network 212 is depicted as a single network in FIG. 2, but may be a continuous or discontinuous network without departing from the scope of this disclosure, so long as at least a portion of the network 212 may facilitate communications between senders and recipients.

The network 212 may be all or a portion of an enterprise or secured network, while in another instance at least a portion of the network 212 may represent a connection to the Internet. In some instances, a portion of the network 212 may be a virtual private network (VPN), such as, for example, the connection between remote system 250 and node 202. Further, all or a portion of the network 212 can comprise either a wireline or wireless link. Example wireless links may include 802.11a/b/g/n, 802.20, WiMax, and/or any other appropriate wireless link. In other words, the network 212 encompasses any internal or external network, networks, sub-network, or combination thereof operable to facilitate communications between various computing components inside and outside the illustrated environment 200. The network 212 may communicate, for example, Internet Protocol (IP) packets, Frame Relay frames, Asynchronous Transfer Mode (ATM) cells, voice, video, data, and other suitable information between network addresses. The network 212 may also include one or more local area networks (LANs), radio access networks (RANs), metropolitan area networks (MANs), wide area networks (WANs), all or a portion of the Internet, and/or any other communication system or systems at one or more locations.

Remote system 250 may have access to resources such as node 202 within network 212. In certain implementations, the servers within network 212, including node 202 in some instances, may comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. Remote system 250 can use cloud-based services to quickly receive software upgrades, applications, and other resources that would otherwise require a lengthy period of time before the resources can be delivered to the remote system 250. Additionally, other devices may also have access to cloud-based services, such as on-demand services provided by servers accessible through network 212. In certain instances, the servers provided through network 212 can be implemented in a clustered network as an on-premise solution, instead of or in addition to a cloud computing system.

As described in the present disclosure, on-demand services can include multiple types of services such as products, actionable analytics, enterprise portals, managed web content, composite applications, or capabilities for creating, integrating, using and presenting business applications. For example, a cloud-based implementation can allow remote system 250 to transparently upgrade from an older user interface platform to newer releases of the platform without loss of functionality.

As illustrated in FIG. 2, node 202 includes a processor 208. Although illustrated as a single processor 208 in FIG. 2, two or more processors may be used according to particular needs, desires, or particular embodiments of environment 200. Each processor 208 may be a central processing unit (CPU), a blade, an application specific integrated circuit (ASIC), a field-programmable gate array (FPGA), or another suitable component. Generally, the processor 208 executes instructions and manipulates data to perform the operations of node 202 and, specifically, the one or more plurality of business process applications 232. Specifically, the server's processor 208 executes the functionality required to receive and respond to requests from the remote system 250 and their respective client applications 254, as well as the functionality required to perform the other operations of the business process application 232.

Regardless of the particular implementation, "software" may include computer-readable instructions, firmware, wired or programmed hardware, or any combination thereof on a tangible, non-transitory, medium operable when executed to perform at least the processes and operations described herein. Indeed, each software component may be fully or partially written or described in any appropriate computer language including C, C++, JAVA, VISUAL BASIC, assembler, Perl, any suitable version of 4GL, as well as others. It will be understood that while portions of the software illustrated in FIG. 2 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 200, processor 208 executes one or more business process applications 232 on node 202.

At a high level, each of the one or more business process applications 232 is any application, program, module, process, or other software that may execute, change, delete, generate, or otherwise manage information according to the present disclosure, particularly in response to and in connection with one or more requests received from the illustrated remote system 250 and its associated client applications 254 or from other servers or components through a network 212. In certain cases, only one business process application 232 may be located at a particular node 202. In others, a plurality of related and/or unrelated business process applications 232 may be stored at a single node 202, or located across a plurality of other nodes 202, as well. In certain cases, environment 200 may implement a composite business process application 232. For example, portions of the composite application may be implemented as Enterprise JAVA Beans (EJBs) or design-time components may have the ability to generate run-time implementations into different platforms, such as J2EE (JAVA 2 Platform, Enterprise Edition), ABAP (Advanced Business Application Programming) objects, or MICROSOFT's .NET, among others.

Additionally, one or more of the business process applications 232 may represent web-based applications accessed and executed by remote system 250 or client applications 254 via the network 212 (e.g., through the Internet). Further, while illustrated as internal to node 202, one or more processes associated with a particular business process application 232 may be stored, referenced, or executed remotely. For example, a portion of a particular business process application 232 may be a web service associated with the application that is remotely called, while another portion of the business process application 232 may be an interface object or agent bundled for processing at a remote system 250. Moreover, any or all of the business process applications 232 may be a child or sub-module of another software module or enterprise application (not illustrated) without departing from the scope of this disclosure. Still further, portions of the business process application 232 may be executed by a user working directly at node 202, as well as remotely at remote system 250.

As illustrated, node 202 can also include a business process management (BPM) runtime 234 that provides services, libraries, and tools for executing business process applications 232 and business process instances. A business process instance is an executing instance of a particular business process. In some cases, multiple instances of the same business process can be running (e.g., multiple discrete purchase orders may be generated simultaneously by different business process instances). Further, multiple instances of the same business process can be running at different nodes such that each business process instance is associated with information specific to the node hosting the business process instance.

The BPM runtime 234 can also handle any state changes to business processes, including state changes associated with execution of process steps based on received events, messages, or requests. Node 202 also includes messaging middleware 240. Messaging middleware 240 can comprise a software or hardware infrastructure configured to facilitate sending and receiving messages between distributed systems. Generally, messaging middleware 240 allows application modules to be distributed over heterogeneous platforms, and reduces the complexity of developing applications that span multiple operating systems and network protocols by insulating the application developer from the details of the various operating system and network interfaces. In some instances, the messaging middleware 240 can provide methods and techniques for sending messages to and receiving messages from other components connected to network 212, such as other distributed systems, clusters of computer nodes, or business applications. The messaging middleware 240 of node 202 can also provide messaging middleware application programming interfaces (API) 242 that allows interaction between node 202 and diverse platforms across different networks.

One or more incoming message adapters 236 can also be included in node 202. The incoming message adapter 236 comprises hardware or software components used to receive messages or events received from external components such as remote system 250, other nodes, or a load balancer 150 or dispatcher. The incoming message adapter can also be coupled with a message analyzer module 238. Message analyzer module 238 can be any application configured to analyze received events to determine an appropriate recipient for the event. For example, message analyzer module 238 can determine that the event should be forwarded to a shared database comprising a messaging queue. In some instances, message analyzer module 238 can determine a specific business process instance and the particular node containing the business process instance that will be the recipient of the event. The event may need to be consumed at a particular node or by a specific process instance based on the external component transmitting the event or on other context information associated with the event. In some instances, the message analyzer module 238 may identify a received event as an event associated with a business process instance executing on the same node 202. In those instances, the received event or message can be consumed without forwarding or sending the message to another node within the cluster system.

In general, node 202 also includes memory 211 for storing data and program instructions. Memory 211 may include any memory or database module and may take the form of volatile or non-volatile memory including, without limitation, magnetic media, optical media, random access memory (RAM), read-only memory (ROM), removable media, or any other suitable local or remote memory component. Memory 211 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of node 202 and its one or more business process applications 232.

Memory 211 can also store data objects such as business process models 214 and business process metadata 216. Business process models 214 can include data objects representing various aspects or processes of an enterprise, and business process metadata 216 can include any metadata associated with business processes that node 202 is managing or interacting with. In some implementations, memory 211 can be a shared database that may be accessed by other nodes within a cluster associated with node 202. Accordingly, memory 211 can be located remotely with respect to node 202 and/or located at a different node within the cluster. Further, memory 211 can be distributed across a plurality of physically or logically distinct repositories.

In some implementations, one or more of the nodes within the cluster can function as an "authoritative indexer" node that manages and tracks one or more process instances. The location and status of process instances executing within a particular cluster can be tracked and managed using an index. In some instances, the index can be partitioned into multiple portions and distributed across different nodes. While a partition of the index can belong to one node, a particular node may be authoritative for multiple partitions or the entire cluster. If an index partition belongs to a given node, the node can be called the "authoritative" node, or "authoritative indexer," for this partition and all index entries within this partition. The index entries for a partition can comprise, for example, process identifiers for each of the process instances indexed in the partition.

For each process instance associated with a cluster, the index partition can be used to determine which cluster node is responsible for handling that process instance. As such, the index partitions may be used to determine which cluster node is the authoritative indexer for a given process instance, and the authoritative indexer has the task to maintain the current ownership state for process instances that are indexed by the authoritative indexer. The authoritative node may be responsible for providing the location of a process instance using its part of a distributed hash table (or other similar look-up mechanism), although the authoritative node may also own (i.e., execute) one or more process instances as well. The mapping of process instances to partitions can be evenly distributed across the nodes of a cluster or distributed in different proportions, depending on the context.

As illustrated in FIG. 2, node 203 represents the authoritative indexer node for the cluster containing nodes 202 and 203. In some implementations, authoritative indexer node 203 can include many of the same or similar components as other nodes within the cluster. For example, authoritative indexer node 203 can include a processor 268, BPM runtime 274, incoming message adapater(s) 276, messaging middleware 280, middleware messaging API 282, message analyzer module 279, business process application 272, and other components needed for node 203 to execute process instances like other nodes within the cluster. Authoritative indexer node 203 can also include components for providing indexing information for process instances currently executing within a cluster. For example, authoritative indexer module 278 can include any software or hardware components needed to receive and respond to requests for resolution information regarding the location of active process instances.

The authoritative indexer module 278 can also update index data 264 stored in memory 261 regarding the location of active process instances. Index data 264 can be an index comprising entries identifying the location and status of currently active process instances within a cluster. The identification information regarding the process instances can include information regarding whether a particular process instance is hydrated or dehydrated in a database. In some implementations, the index data 264 can also be partitioned and distributed across various systems such as other nodes within a cluster. In other words, each node within a cluster can include a portion of the indexed data. The authoritative indexer module 278 in authoritative indexer node 203 can retrieve index data from each of the nodes as needed to determine the location for a particular process instance. In some implementations, authoritative indexer module 278 and/or index data 264 can be provided as in-memory components.

The illustrated environment of FIG. 2 also includes one or more remote systems 250. Each remote system 250 may be any computing device operable to connect to or communicate with at least node 202 and/or via the network 212 using a wireline or wireless connection. Further, as illustrated in FIG. 2, remote system 250 includes a processor 256, an interface 255, a graphical user interface (GUI) 252, a client application 254, and a memory 258. In general, remote system 250 comprises an electronic computer device operable to receive, transmit, process, and store any appropriate data associated with the environment 200 of FIG. 2. It will be understood that there may be any number of remote system 250 associated with, or external to, environment 100. For example, while illustrated environment 200 includes remote system 250, alternative implementations of environment 200 may include multiple clients communicably coupled to node 202, or any other number of clients suitable to the purposes of the environment 200. Additionally, there may also be one or more additional remote systems external to the illustrated portion of environment 200 that are capable of interacting with the environment 200 via the network 212. The term "remote system" may also refer to any computer, application, or device, such as a mobile device, that is communicably coupled to one or more servers through a network 212. Moreover, while each remote system 250 is described in terms of being used by a single user, this disclosure contemplates that many users may use one computer, or that one user may use multiple computers.

The GUI 252 associated with remote system 250 comprises a graphical user interface operable to, for example, allow the user of remote system 250 to interface with at least a portion of the platform for any suitable purpose, such as creating, preparing, requesting, or analyzing data, as well as viewing and accessing source documents associated with business transactions. Generally, the GUI 252 provides the particular user with an efficient and user-friendly presentation of business data provided by or communicated within the system. The GUI 252 may comprise a plurality of customizable frames or views having interactive fields, pull-down lists, and buttons operated by the user. Generally, GUI 252 may also provide general interactive elements that allow a user to access and utilize various services and functions of application 254. The GUI 252 is often configurable, supports a combination of tables and graphs (bar, line, pie, status dials, etc.), and is able to build real-time portals, where tabs are delineated by key characteristics (e.g. site or micro-site). Therefore, the GUI 252 contemplates any suitable graphical user interface, such as a combination of a generic web browser, intelligent engine, and command line interface (CLI) that processes information in the platform and efficiently presents the results to the user visually.

As used in this disclosure, remote system 250 can encompass a personal computer, touch screen terminal, workstation, network computer, kiosk, wireless data port, smart phone, personal data assistant (PDA), one or more processors within these or other devices, or any other suitable processing device. For example, each remote system 250 may comprise a computer that includes an input device, such as a keypad, touch screen, mouse, or other device that can accept user information, and an output device that conveys information associated with the operation of the node 202 (and business process application 232) or the remote system 250 itself, including digital data, visual information, the client application 254, or the GUI 252. Both the input and output device may include fixed or removable storage media such as a magnetic storage media, Compact Disc Read-only Memory (CD-ROM), or other suitable media to both receive input from and provide output to users of remote system 250 through the display, namely, the GUI 252.

While FIG. 2 is described as containing or being associated with a plurality of elements, not all elements illustrated within environment 200 of FIG. 2 may be utilized in each alternative implementation of the present disclosure. For example, one or more of the elements described herein may be located external to environment 200, while in other instances, certain elements may be included within or as a portion of one or more of the other described elements, as well as other elements not described in the illustrated implementation. Further, certain elements illustrated in FIG. 2 may be combined with other components, as well as used for alternative or additional purposes in addition to those purposes described herein.

Figure 3:
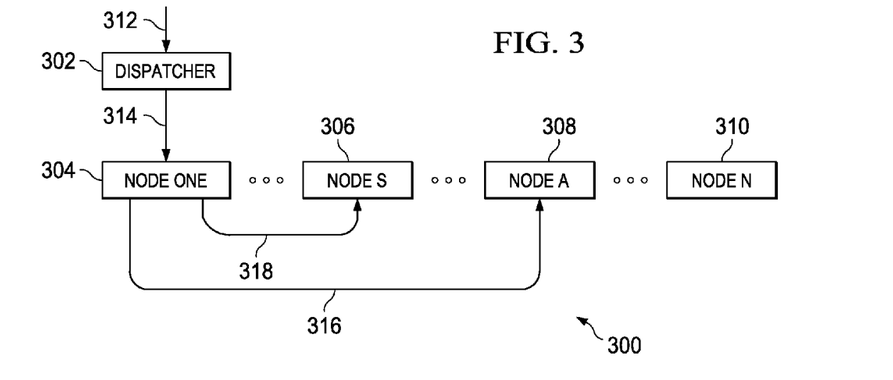
FIG. 3 illustrates a diagram of an example process for dispatching an incoming event when the target process instance is active.

FIG. 3 illustrates an example diagram 300 of scalable event dispatching in a cluster node implementation when a target process instance is currently running on a cluster node. Although four cluster nodes 304, 306, 308, and 310 are illustrated in FIG. 3, the cluster infrastructure can include fewer or more cluster nodes. As depicted in FIG. 3, a message (i.e., event) is received at dispatcher node 302 at 312. Dispatcher 302 can be any processor, whether implemented as hardware or software, such as a load balancer, specialized cluster node, or other component. Dispatcher 302 represents a first-level dispatching mechanism that receives incoming events from external components and performs an initial distribution of the events among the nodes within a cluster. In some instances, dispatcher 302 distributes received events among the cluster nodes randomly.

In the illustrated example, dispatcher 302 distributes the incoming event to a first cluster node 304 ("Node 1") at 314. If cluster node 304 contains a target process instance associated with the event, the event may be processed locally at cluster node 304 by that target process instance as long as there is not a lock on the process instance. If there is not a particular active process instance that is identified as an appropriate target for the event, the event can be automatically processed locally at the receiving cluster node 304 or assigned to a currently active process instance. In some situations, there may be no active process instances at cluster node 304 or any of the other nodes within the same cluster. Since no process instances are available to process the event, a new process instance can be instantiated at cluster node 304 so that the event does not need to be routed to a different cluster node. Similarly, when there are no active process instances at any node in a cluster, or no target process instance is identified for the particular event, a new process instance can be instantiated at the node at which the event is first received from the load balancer.

In certain situations, the first cluster node 304 to receive the event from dispatcher 302 may not have a process instance that is suitable to process the event. Instead, one or more business process instances located at other cluster nodes may be the appropriate recipients of the event. For example, as determined from the context of information associated with the received event, a particular process instance located at cluster node 306 ("Node s") may be the targeted process instance that should process the event even though the event initially resides at cluster node 304 after it was distributed by dispatcher 302. Instead of migrating the target process instance from cluster node 306 to cluster node 304 to handle the event, the event can be rerouted to the appropriate cluster node 306 for processing if the target process instance is currently active at cluster node 306.

Node 304 can perform a context-based evaluation of the received event to determine the target process instance that will handle the event. In some instances, the event may specify a particular process instance with which the event is associated, while in other instances, the particular process instance associated with the event may be derived based on a rule set or other method of association. Node 304, however, may not have information regarding where the target process instance is located. For example, due to the dynamic and flexible nature of clustered environments, process instances can be frequently reassigned when cluster nodes are added or removed from the cluster.

In some implementations, the determination of which cluster node is the "owner" of the target process instance can be performed in connection with a distributed indexing mechanism. For example, an index associated with the nodes of a cluster can be provided to track ownership of process instances within the cluster. The index can represent a snapshot view of the authoritative data (e.g., which node is responsible for handling a particular process instance) of the cluster at a given point in time and can be updated to reflect structural changes to the cluster (e.g., after a node joins or drops from the cluster). In certain implementations, the cluster can use a distributed hash map to determine where the processes are located (e.g., at which node of cluster), and to re-allocate ownership of a process instance (e.g., if a process instance was owned by a departing node) to other nodes after a structural change. The content of the distributed hash map can be separated into partitions, where each partition is distributed to one of the nodes in the cluster. While a partition of the index can belong to one node, a particular node may be authoritative for multiple partitions or the entire cluster. If an index partition belongs to a given node, the node can be called the "authoritative" node, or "authoritative indexer," for this partition and all index entries within this partition. The index entries for a partition can comprise, for example, process identifiers for each of the process instances indexed in the partition.

For each process instance associated with a cluster, the index partition can be used to determine which cluster node is responsible for handling that process instance. As such, the index partitions may be used to determine which cluster node is the authoritative indexer for a given process instance, and the authoritative indexer has the task to maintain the current ownership state for process instances that are indexed by the authoritative indexer. The authoritative node may be responsible for providing the location of a process instance using its part of a distributed hash table (or other similar look-up mechanism), although the authoritative node may also own (i.e., execute) one or more process instances as well. The mapping of process instances to partitions can be evenly distributed across the nodes of a cluster or distributed in different proportions, depending on the context.

In some implementations, the authoritative index does not include the complete distributed hash table, but only a part of the hash table. The distributed hash table can function as a "lookup" table in which a name-value pair is stored in the distributed hash table, so that the distributed hash table can efficiently lookup a node given a key (e.g., a process identifier). As such, the distributed hash table may be used to determine the location of a process instance. For example, certain nodes can manage a partition of the distributed hash table, which exclusively contains process instances alongside their physical location at a node. A particular node, which holds the information of where a particular process instance is located, is the authoritative indexer for this process instance. If a node other than the authoritative indexer attempts to determine where a process instance is located, the node first determines the authoritative indexer of the process instance by applying a hash function on the process instance identity, such as a particular identifier associated with the process instance. The node can then send a request to the authoritative indexer to return the current physical location of the process instance. The authoritative indexer can retrieve this information from its hash table fragment and return the location to the requesting node. Although the use of a distributed hash table is described in the present example, other look-up mechanisms can be used to determine the location of a process instance within a cluster and are within the scope of the present disclosure, such as database look-ups, table look-ups, and the like.

In the illustrated example, the nodes of the depicted cluster, including cluster node 304, can each store a portion of the distributed hash table. Cluster node 304 can determine that the authoritative indexer associated with the target process instance is cluster node 308 by applying a hash function on the identifier of the target process instance. Accordingly, cluster node 304 can then request resolution information from the authoritative indexer at cluster node 308 at 316. In particular, the resolution information can include information identifying the particular cluster node at which the target process instance can be found. In the present example, the target process instance is located at cluster node 306, and accordingly, cluster node 304 can forward the event to cluster node 306 at 318. In essence, the cluster node that initially receives the event can act as a proxy that redirects the event to the appropriate cluster node containing the target process instance. Similarly, the cluster node can also redirect responses back to the dispatcher or requestor from which the event was initially received.

In some instances, task management and user interfaces associated with the event may still reside at cluster node 304. If the incoming event is associated with a synchronous request, the processes and tasks may need to be synchronized between the task parent node (cluster node 306) and the task processor (cluster node 304) in accordance with the BPEL4People specification. In the case of an incoming asynchronous request, if the target process instance is not running at the incoming node, the event may be stored in a message pool from which the process instance running on another node can retrieve the event for processing at another time.

In certain instances, the context-aware dispatching functionality of the present disclosure can differ based on the status of the target process instance. In some instances, the target process instance may be currently active at a particular cluster node when an incoming event is received at a different cluster node. In this situation, as described above in relation to FIG. 3, the cluster node that initially receives the event from the dispatcher directly forwards the event to the appropriate cluster node. In some instances, however, the target process instance may not be presently active at a cluster node. In other words, the target process instance may be dehydrated, or stored in a database. Process instances can be hydrated or dehydrated depending on the context. Process instances can be dehydrated when the process instance is in an idle state, such as when the process instance is delayed or awaiting a response from a different component or user. Dehydration of a process instance can include releasing the process instance from memory and persisting, or storing, the process instance in a database. In some instances, a persistence service can also be used to save or persist the state of the process instance to facilitate rehydration of the process instance when the process instance is re-activated. Hydration or rehydration of a previously dehydrated process instance can include reloading the process instance into memory and resuming the process instance from the previous state before the process instance was dehydrated.

Figure 4:
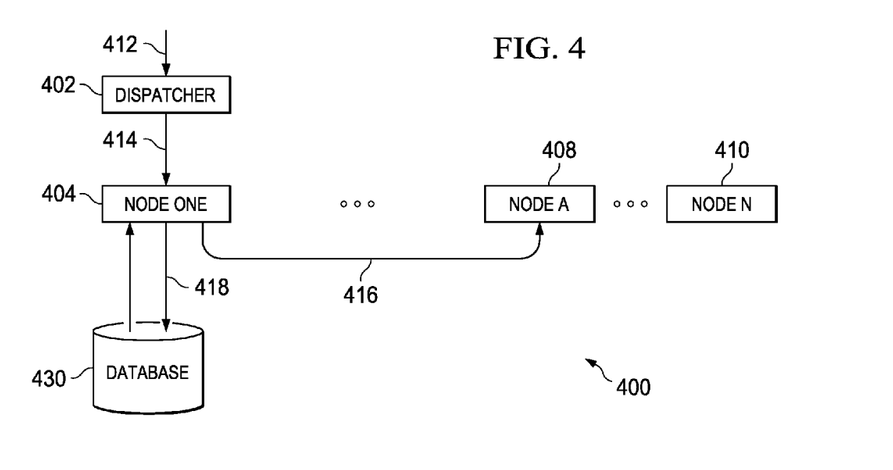
FIG. 4 illustrates a diagram of an example process for dispatching an incoming event when the target process instance is dehydrated.

FIG. 4 illustrates an example diagram 400 of scalable event dispatching in a cluster node implementation when a target process instance is dehydrated. An event arrives at the dispatcher at 412, where it will be distributed to one of the nodes in the cluster depicted in FIG. 4. In the illustrated example, cluster node 404 is the initial recipient of the event at 414. The event, although dispatched to cluster node 404, may need to be processed by a target process instance located at a different cluster node. As described above with respect to FIG. 3, cluster node 404 can identify the authoritative indexer node associated with the target process instance by using a distributed hash map. Cluster node 404 can then request resolution information of the identified authoritative indexer located at cluster node 408 at 416 to determine an appropriate target process instance for processing the event and the location of the target process instance. The resolution information received from the authoritative indexer at cluster node 408 may, for example, indicate that the target process instance has been dehydrated within database 430. In some implementations, database 430 is a shared resource among a plurality of cluster nodes within the cluster depicted in FIG. 4. Cluster node 408 can then rehydrate the process instance from database 430 and restore the process instance directly at cluster node 408 to trigger the event.

Figure 5:
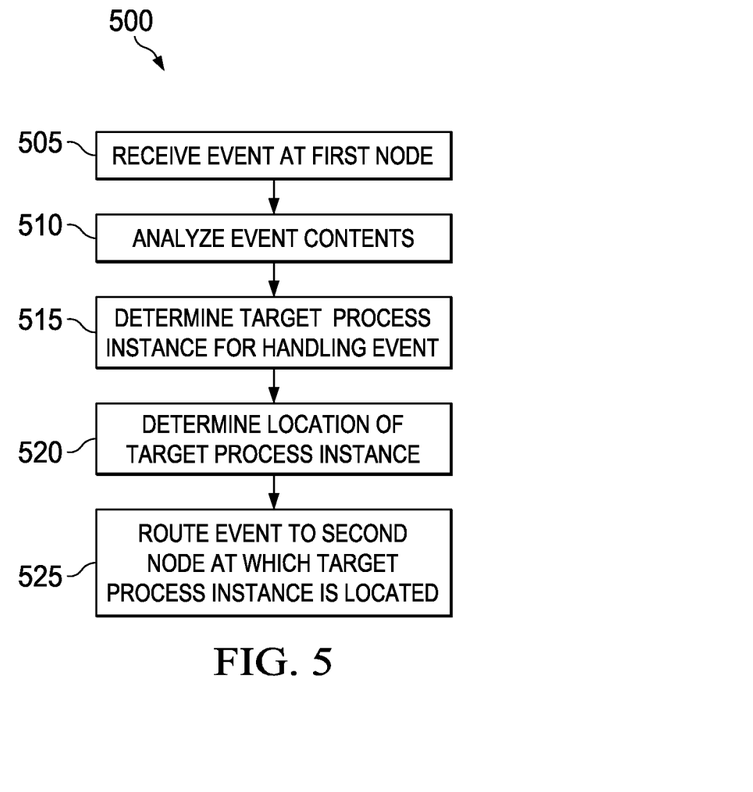
FIG. 5 is a flowchart of an example process for dispatching an incoming event to a target process instance using an appropriate system, such as the system described in FIG. 2.

FIG. 5 illustrates an example process 500 for dispatching events to target process instances. In certain implementations, events can be received at a first-level dispatcher, such as a load balancer, and distributed to one of several cluster nodes. The events can then be rerouted based on second-level dispatching functionality at the cluster node level to a particular cluster node containing a target process instance that will handle the event. First, an event is received at a first cluster node at 505. In some instances, the event is received at the first node from a load balancer while in other instances, the event can be received directly from a business application or external component. The contents of the event are analyzed at 510. The event can be evaluated based on semantic analysis or context-based analysis to determine whether a particular process instance is targeted by the process instance or suitable to handle the event. Accordingly, a target process instance that will handle the event is determined at 515.

In certain instances, the target process instance may be located at a different cluster node than the first node that received the event. Thus, the location of the target process instance is determined at 520. The specific cluster node containing the target process instance can be determined using any suitable means, such as through an authoritative indexer node based on a distributed hash map, as described above in connection with FIG. 3. If the target process instance is determined to be located at a second cluster node, the event is routed to the second node at which the target process instance is located at 525.

Figure 6:
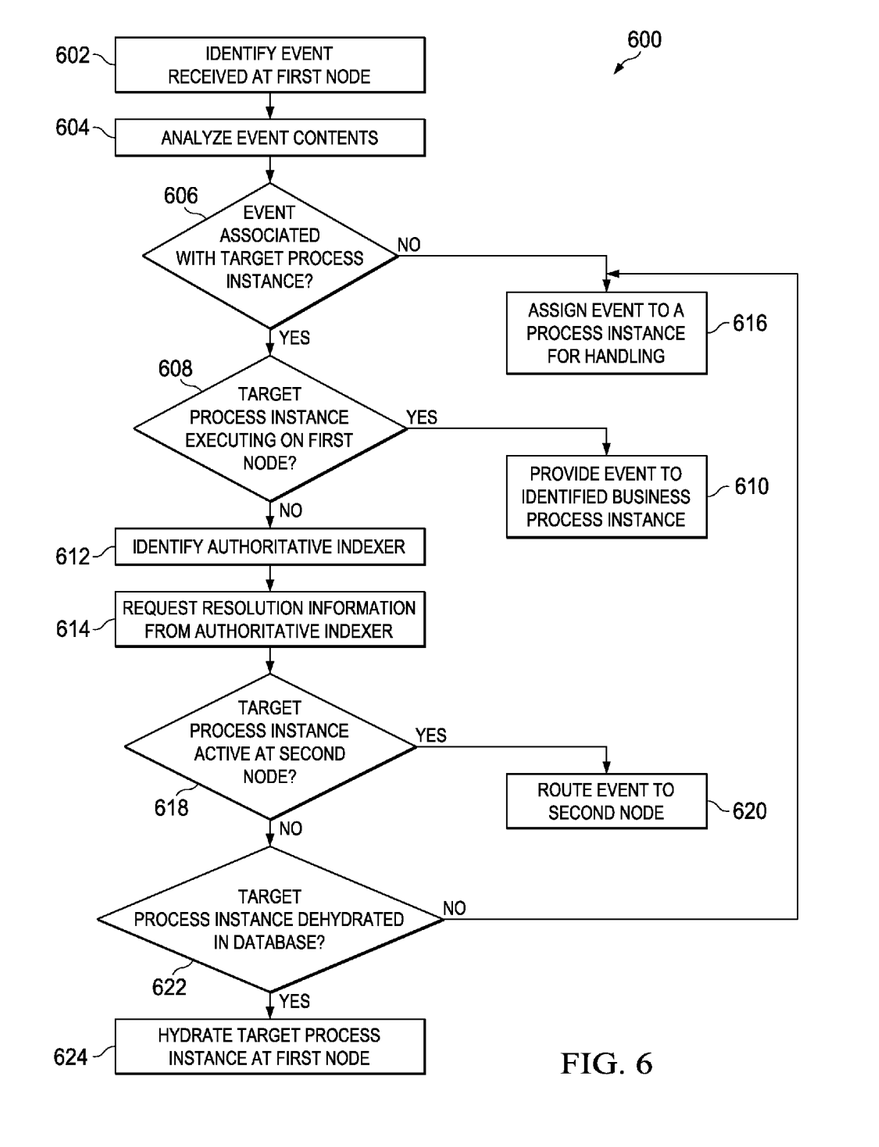
FIG. 6 is a flowchart of an example process for dispatching an incoming event to a target process instance using an appropriate system, such as the system described in FIG. 2.

FIG. 6 illustrates a detailed example process 600 for dispatching events to target process instances. An event received at a first cluster node is identified at 602. The contents of the event are analyzed at 604 to determine whether the event may be associated with a particular process instance, called the target process instance, that will ultimately receive and handle the event. In other words, the contents of the event may be used to determine a destination for the event since the target process instance may be located at a different cluster node. In some instances, the event may not be associated with a target process instance or it may not be apparent from the analysis of the contents of the event which process instance is appropriate for the event. If it is determined that the event is not associated with a particular target process instance at 606, the event can be assigned to a process instance for handling at 616. A new process instance can be instantiated for handling the event or a local, current process instance can be assigned the event, for example. In some instances, although the analysis at 604 may not identify a specific process instance associated with the event, a determination can be made as to whether certain process instances may be more suitable than others for handling the incoming event based on the context of the event and available process instances.

If it is determined from the analysis that the event is associated with a target process instance, a further determination can be made as to whether the target process instance is executing on the first cluster node at 608. In some instances, the target process instance can be located at the same cluster node that first receives the event from an external source or from a first-level dispatcher such as load balancer 150. If so, the event is provided to the process instance locally at the first node at 610. If the target process instance is not executing on the first node but at a different cluster node, the appropriate cluster node at which the target process instance is located needs to be determined.

In some implementations, a distributed index mechanism as described above in connection with FIG. 3 can be used to identify the location of the target process instance. In this method, a particular cluster node can serve as the authoritative indexer for the target process instance. The authoritative indexer node can manage the states and locations of a number of process instances within the cluster. Accordingly, in order to determine the location of the target process instance, the authoritative indexer associated with the target process instance is identified at 612. In certain implementations, the first node can apply a hash function to an identifier of the target process instance to determine the authoritative indexer for that process instance.

Once the authoritative indexer is determined, resolution information can be requested from the authoritative indexer at 614. The resolution information can indicate the status of the target process instance, such as the particular cluster node currently housing the target process instance and whether the target process instance is currently active or dehydrated. If the target process instance is currently active at a second cluster node as determined at 618, the first cluster node can route the event to the second cluster node at 620 based on the resolution information obtained from the authoritative indexer. If the resolution information from the authoritative indexer indicates that the target process instance is not currently active, it may be because the target process instance has been dehydrated or stored in a database. If it is determined that the target process instance is dehydrated at 622, the first node can rehydrate, or restore, the target process instance from the database at 624. Generally, the nodes within a cluster can share access to certain resources, such as a shared database. Accordingly, the first node can rehydrate the target process instance locally at the first node. Alternatively, the target process instance may be rehydrated at a different cluster node as needed. If it is determined from the resolution information that the target process instance is neither active at a particular cluster node nor dehydrated in the database, the event can be assigned a different process instance for handling at 616.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for dispatching an event to a business process instance, the method comprising the following operations:

receiving an event at a first computer node in a plurality of computer nodes, the plurality of nodes comprising a cluster computing infrastructure, the event received from a first-level dispatcher associated with the cluster computing infrastructure, and the first computer node acting as a second-level dispatcher for the cluster computing infrastructure in response to receiving the event;

analyzing contents of the event at the first computer node using second-level dispatcher functionality to determine an active target process instance currently executing on a particular computer node within the cluster computing infrastructure and associated with the event;

determining a target computer node hosting the currently executing target process instance, the target computer node comprising a second computer node in the plurality of computer nodes; and sending the event from the first computer node acting as the second-level dispatcher to the target computer node for handling by the currently executing target process instance.

2. The method of claim 1, wherein the target computer node is the first computer node.

3. The method of claim 1, wherein the event is one of a message or a request associated with a business process executing in at least a portion of the cluster computing infrastructure.

4. The method of claim 1, wherein the first-level dispatcher is a load balancer, the load balancer configured to distribute events to computer nodes within the cluster computing infrastructure, where events received at the cluster computing infrastructure are first received at the first-level dispatcher.

5. The method of claim 4, wherein the load balancer is further configured to distribute events to computer nodes without analyzing contents of the events.

6. The method of claim 1, wherein the first computer node and the target computer node are computing devices utilized in a business process management environment executing in the cluster computing infrastructure.

7. The method of claim 1, wherein determining the target computer node hosting the target process instance comprises:

identifying an authoritative indexer node associated with the target process instance, the authoritative indexer node comprising at least one node within the cluster computing infrastructure where process instance execution location and process instance status information for a plurality of process instances are tracked for process instances associated with the cluster computing infrastructure;

requesting resolution information from the authoritative indexer node, the resolution information including at least one of a status of the target process instance or a particular computer node within the plurality of computer nodes in the cluster computing infrastructure in which the target process instance is currently active; and identifying the target computer node associated with the target process instance based on the resolution information received from the authoritative indexer node.

8. The method of claim 7, wherein identifying the authoritative indexer node comprises applying a hash function to an identifier of the target process instance to determine the authoritative indexer node associated with the target process instance.

9. The method of claim 7, wherein the resolution information is determined by retrieving index data associated with the target process instance from a computer node other than the authoritative indexer node.

10. The method of claim 1, wherein each of the plurality of nodes of the cluster computing infrastructure include second-level dispatching functionality.

11. A computer program product encoded on a non-transitory, tangible storage medium, the product comprising computer readable instructions for causing one or more processors to perform operations comprising:

receiving an event at a first computer node in a plurality of computer nodes, the plurality of nodes comprising a cloud computing infrastructure, the event received from a first-level dispatcher associated with the cloud computing infrastructure, and the first computer node acting as a second-level dispatcher for the cloud computing infrastructure in response to receiving the event;

analyzing contents of the event at the first computer node using second-level dispatcher functionality to determine a target process instance currently executing on a particular computer node within the cloud computing infrastructure and associated with the event;

determining a target computer node hosting the currently executing target process instance, the target computer node comprising a second computer node in the plurality of computer nodes; and sending the event from the first computer node acting as the second-level dispatcher to the target computer node for handling by the currently executing target process instance.

12. The computer program product of claim 11, wherein the first-level dispatcher is a load balancer, the load balancer configured to distribute events to computer nodes within the cloud computing infrastructure, where events received at the cloud computing infrastructure are first received at the first-level dispatcher.

13. The computer program product of claim 12, wherein the load balancer is further configured to distribute events to computer nodes without analyzing contents of the events.

14. The computer program product of claim 11, wherein the first computer node and the target computer node are computing devices utilized in a business process management environment executing in a cloud computing infrastructure.

15. The computer program product of claim 11, wherein determining the target computer node hosting the target process instance comprises:

identifying an authoritative indexer node associated with the target process instance, the authoritative indexer node comprising at least one node within the cluster computing infrastructure where process instance execution location and process instance status information for a plurality of process instances are tracked for process instances associated with the cluster computing infrastructure;

requesting resolution information from the authoritative indexer node, the resolution information including at least one of a status of the target process instance or a particular computer node within the plurality of computer nodes in the cluster computing infrastructure in which the target process instance is currently active; and identifying the target computer node associated with the target process instance based on the resolution information received from the authoritative indexer node.

16. The computer program product of claim 15, wherein identifying the authoritative indexer node comprises applying a hash function to an identifier of the target process instance to determine the authoritative indexer node associated with the target process instance.

17. The computer program product of claim 15, further comprising restoring the target process instance from a database if the resolution information indicates that the target process instance is dehydrated in the database.

18. A system, comprising:

memory operable to store an event received at a first-level dispatcher for the system; and one or more processors operable to:

receive an event at a first computer node within the system, the system including a plurality of computer nodes comprising a cluster computing infrastructure, the event received from the first-level dispatcher, and the first computer node acting as a second-level dispatcher for the cluster computing infrastructure in response to receiving the event;

analyze contents of the event at the first computer node using second-level dispatcher functionality to determine a target process instance associated with the event;

determine whether the target process instance is currently executing on a particular computer node within the cloud computing infrastructure and associated with the event or whether the target process instance is in an idle state in a shared database;

in response to determining that the target process instance is currently executing:

determine a target computer node hosting the currently executing target process instance, the target computer node comprising a second computer node in the plurality of computer nodes; and send the event from the first computer node acting as the second-level dispatcher to the target computer node for handling by the currently executing target process instance; and in response to determining that the target process instance is in an idle state in the shared database:

identify a current location of the target process instance; and restore the target process instance from the shared database storing process instances executing in the cluster computing infrastructure, wherein restoring the target process includes:

retrieving the target process instance from the shared database;

resuming, at a second computer node, the target process instance at a state of the target process instance prior to storage of the target process instance at the shared database; and providing the event from the second-level dispatcher to the target process instance at the second computer node for processing.

19. The system of claim 18, wherein identifying the current location of the target process instance comprises:

identifying an authoritative indexer node associated with the target process instance;

requesting resolution information from the authoritative indexer node; and identifying the current location of the target process instance in the shared database based on resolution information received from the authoritative indexer node.

20. The system of claim 18, wherein identifying the authoritative indexer node comprises applying a hash function to an identifier of the target process instance to determine the authoritative indexer node associated with the target process instance.

* * * * *